United States Patent Office 3,157,352
Patented Nov. 17, 1964

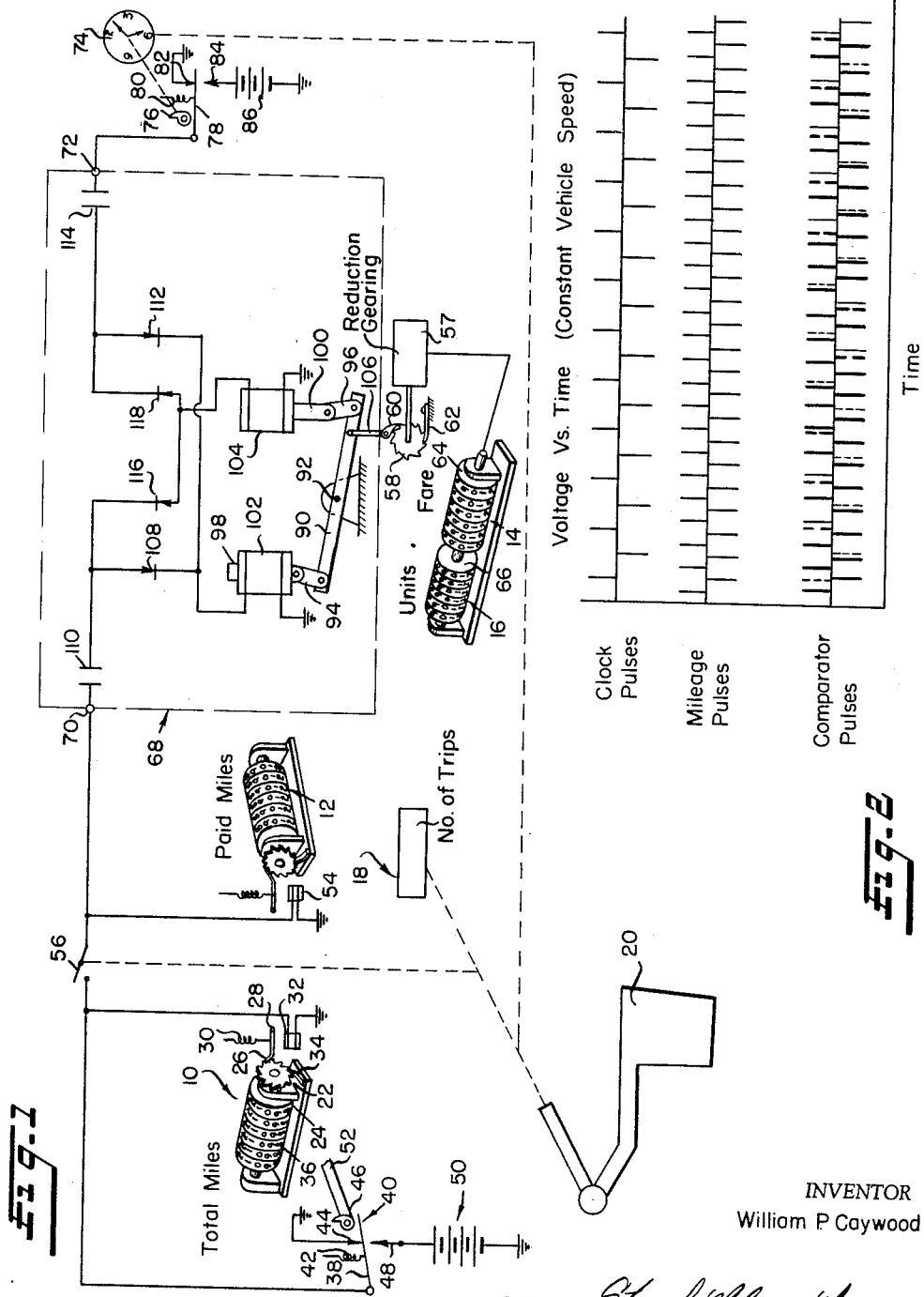

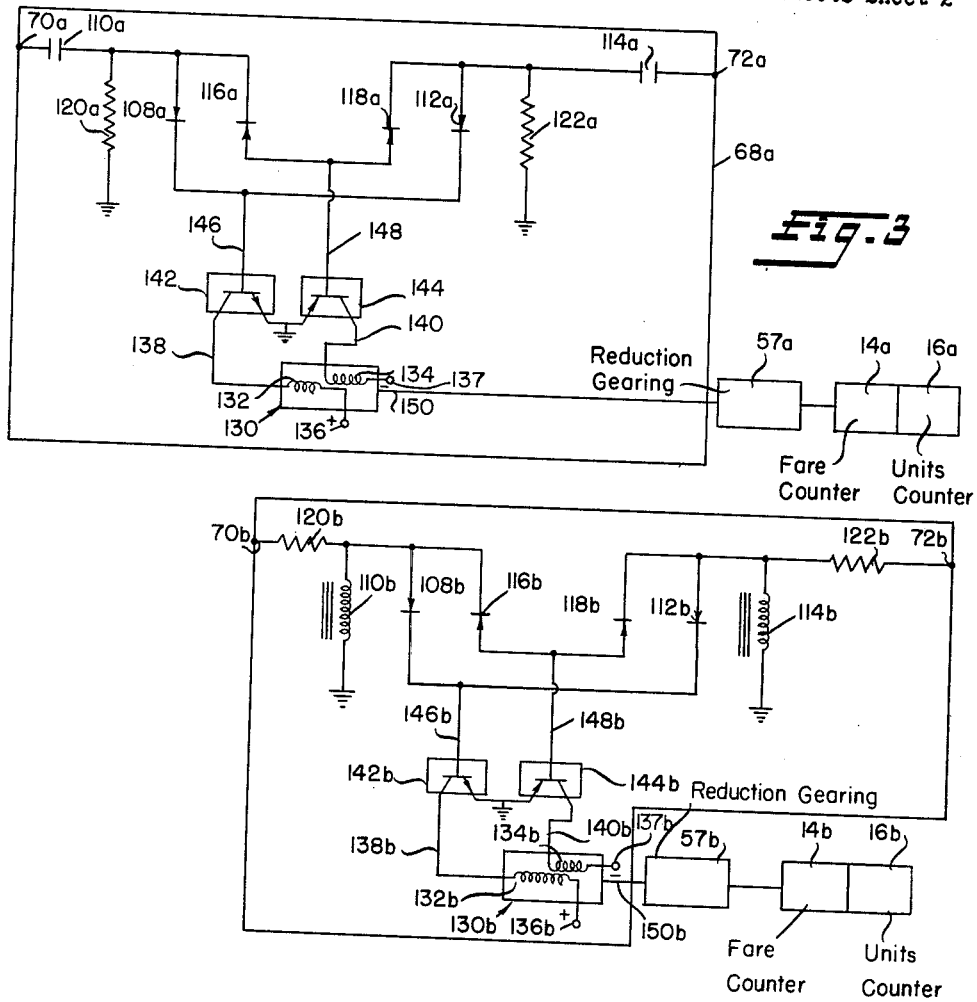

3,157,352
ALL-ELECTRIC TAXIMETER
William P. Caywood, Murrysville, Pa., assignor to Rockwell Manufacturing Company, a corporation
Filed July 24, 1961, Ser. No. 126,118
17 Claims. (Cl. 235—30)

The present invention relates to improvements in taximeters.

Taximeters must provide individual registers to register the total miles traveled by the vehicle, the total paid miles traveled by the vehicle, the number of trips, the fare to be paid, and the total number of paid units. The fare to be paid during any particular trip is, in most localities, a composite amount based on the total mileage for the trip and the elapsed time for the trip. That is, when the vehicle is traveling at normal speed the fare register is advanced on the basis of mileage, but when the vehicle is stopped, as at a stop light or in heavy traffic, it is advanced on the basis of time. The fare register must be re-set to zero at the end of each paid trip. The paid units registered is actually a grand total of all the fares and is accumulated in a register which is actuated in parallel with the fare register but, unlike the fare register, is not re-set after each trip. The units register will thus register the equivalent of the total of all fares.

Commercially available taximeters are at least generally of substantially purely mechanical construction. The mechanism necessary to mechanically inter-relate the various required registers to perform the above described individual function is of necessity relatively complex and expensive. An example of a taximeter of this type is disclosed in United States Patent 2,596,164 issued May 13, 1952 to B. C. Palmer for Taximeter.

The primary object of this invention is to provide an essentially all electrical taximeter which will perform all essential functions of prior taximeters but which is of greatly simplified and less expensive construction than the mechanical meters heretofore used.

A more specific object of this invention is to provide an electro-mechanical taximeter embodying a plurality of electrically actuated mechanical registers to register the essential taximeter data.

A further object of this invention is to provide a taximeter having a pair of electrical signal generators for providing signal pulses trains the pulse recurrence rates of which are respectively indicative of the velocity of the vehicle and the elapse of time, a fare register and a signal comparator responsive to both signals and operative to actuate the fare register in accord with the one of said signals having the more rapid pulse recurrence rate.

A further object of this invention is to provide a new and improved pulse recurrence rate comparator operable to produce an output in accord with the more rapid pulse recurrence rate of a applied pair of pulse trains.

These and other objects of the present invention will become more apparent by reference to the appended claims and as the following detailed description proceeds in reference to the accompanying drawings wherein:

FIGURE 1 is a schematic illustration of a taximeter constructed in accord with the principles of the present invention;

FIGURE 2 is a graph illustrating the inter-relation and inter-action of the vehicle velocity and time pulse trains to control the actuation of the fare register;

FIGURE 3 is a diagrammatic illustration of a modified comparator primarily for use in the taximeter of FIGURE 1; and FIGURE 4 is a diagrammatic illustration of a third modification of the comparator of FIGURE 1.

Referring now to FIGURE 1, the taximeter of the present invention is provided with a "total mileage" register 10, a "paid mileage" register 12, a "fare" register 14, a "units" register 16, and a "number of trips" register 18. The "number of trips" register 18 is a conventional mechanically actuated stepping counter connected to the meter flag 20 (or the meter control panel if it is not a flag type taximeter) so that the register 18 is advanced one unit each time the flag 20 is moved to a first limit position to indicate the start of a trip and prepared to actuate register 18 each time the flag is moved to is other limit position at the end of a trip. The counter mechanism per se of register 18 may be of the construction shown in United States Patent No. 1,909,740 issued May 16, 1933 to Zubaty for Odometer Mechanism equipped with any suitable pawl and ratchet input to the units order wheel.

The total miles register 10 is a conventional plural order counter mechanism such as that of said Zubaty patent having a ratchet 22 drive connected to its units order drum 24 through a suitable reduction gearing (not shown) depending upon the number of revolutions per mile of the speedometer cable, actuated by a stepping pawl 26 pivoted at 28 and biased by a spring 30. The pawl 26 is pivoted in a counterclockwise direction about pivot 28 upon energization of a magnet 32 and in a clockwise direction by spring 30 upon de-energization of the magnet 32. Reverse rotation of the ratchet 22 is prevented by a detent 34. Upon energization of the magnet 32, the pawl 26 passes over one tooth and engages the next tooth and upon de-energization of the magnet 32, the spring restores pawl 26 to its original position and advances the ratchet 22 one tenth of a revolution in a counterclockwise direction. The units order drum 24 is connected to the tens order drum 36 by a conventional mechanical carryover mechanism (not shown) and each succeeding higher order drum is connected to the next adjacent lower order drum by a similar tens carry mechanism.

The magnet 32 is connected at one side to ground as indicated and is connected at the other side to the transfer contact 38 of a cam actuated circuit modifying device or switch mechanism 40. Transfer contact 38 is normally biased by a spring 42 into contact with a fixed electrical contact 44 connected to ground but, when actuated by insulated cam 46, is transferred into electrical contact with an opposed normally open fixed contact 48 connected to a suitable source of direct current potential such as battery 50 which will normally be the battery power supply of the vehicle. The cam 46 is connected to rotate with the speedometer cable 52 of the vehicle. Upon each revolution of the speedometer cable 52, the transfer contact 38 is shifted from its normal position as shown to its transferred positions in which it is disengaged from contact 44 and engaged with contact 48. This establishes a circuit from ground, through battery 50, through contact 48, through transfer contact 38, and through magnet 32 to ground to energize magnet 32. Upon release of transfer contact 38 by the cam 46, it will be restored to engagement with contact 44 to ground both sides of and thereby de-energize magnet 32 and permit advance of drum 24 a fraction of a revolution under the influence of the spring 30 as determined by the interposed reduction gearing.

The "paid miles" register 12 is of the same mechanical construction as the "total mileage" register 10, being provided with an actuating magnet 54 connected at one side to ground and connected through a switch 56 to the transfer contact 38 of the cam actuated switch mechanism 40. The switch 56 is normally open and is closed when and so long as the flag 20 is pivoted to and in its operative position. By this arrangement so long as the flag 20 is in its inoperative position, the paid miles register 12 will remain at rest. When the flag 20 is pivoted to its operative position and the switch 56 thereby closed, the "paid miles" register 12 will advance at the same time and at the same rate as the "total mileage" register 10.

The "fare" register 14 and the "units" register 16 are of generally the same construction as the "total mileage" register 10 but are driven through a suitable reduction gear mechanism 57 by a common ratchet 58 actuated by a pawl 60 and detent 62. The drive shaft of an automobile makes approximately 400 revolutions per fare unit. The "units" register 16 is a non-resettable register. The "fare" register 14 is a resettable register, being equipped with any conventional zero reset mechanism (not shown) actuated by the movement of the flag 20 to its operative position. Each time the ratchet 58 is advanced one tenth of a revolution, the units order drum 64 of the "fare" register 14 and the units order drum 66 of the "units" register 16 will be advanced simultaneously a fraction of a revolution as determined by the gearing 57. The reduction ratio of gearing 57 will vary depending upon the fare rates in the particular community in which the taximeter is being utilized. The higher order denominational drums of the "units" register 16 and the "fare" register 14 are interconnected and connected to the units order drums 66 and 64 respectively by conventional tens-carry mechanisms not shown.

The "units" register 16 and the "fare" register 14 are controlled by a comparator unit 68 having a first input terminal 70 connected through the switch 56 to switch 40 acting as an impulse generator having a pulse recurrence rate variable in accord with and indicative of the vehicle velocity and a second input terminal 72 connected to a suitable source of uniformly spaced electrical impulses acting as a second impulse generator producing pulses at a uniform pulse recurrence rate indicative of time. This latter source of impulses comprises a conventional battery actuated electrical clock or escapement mechanism 74 which is activated upon movement of the flag 20 to turn the meter on and having a switch actuating cam 76 suitably connected through appropriate gearing (not shown) to the second-hand shaft of the clock mechanism 74. The cam 76 actuates a pivoted transfer contact 78 which is normally biased by a spring 80 into engagement with a fixed contact 82 connected to ground as shown and which is transferred once during each revolution of the cam 76 into engagement with an opposed fixed contact 84 connected to a suitable source of direct current potential such as battery 86. (In actual practice 86 will be the same battery as battery 50 but for simplicity in illustration has been shown as a separate battery.)

From the foregoing description it is apparent that when the flag 20 has been selectively actuated to its operative position by the vehicle operator to close switch 56, a train of electrical impulses generated by the actuation of switch 40 and having a variable pulse recurrence rate indicative of vehicle velocity will be imposed upon the input terminal 70 of the comparator 68 and that a further train of impulses of uniform recurrence rate will be imposed upon the input terminal 72 of the comparator 68 by the actuation of the contact 78 under the control of the clock 74.

The comparator 68, as illustrated in FIGURE 1, comprises a lever 90 centrally pivoted at 92 and connected at its opposite ends by links 94 and 96 respectively to the movable cores 98 and 100 of solenoids 102 and 104. When the solenoid 102 is energized, lever 90 is caused to pivot in a clockwise direction to the position shown, and when the solenoid 104 is energized, the lever 90 is pivoted in a counterclockwise direction to the reverse position. Lever 90 is connected by a suitable linkage 106 to the stepping pawl 60 engaging the ratchet 58. Each time the lever 90 pivots in a clockwise direction, the units order drums 64 and 66 are advanced a fraction of a revolution as determined by the reduction ratio of gearing 57. Each time the lever 90 is pivoted in a counterclockwise direction, the pawl 60 is drawn over a tooth of the ratchet 58 to prepare it for the next advancing step of engagement with ratchet 58.

As illustrated, the solenoids 102 and 104 are each electrically connected at one side to ground. Solenoid 102 is connected at the other side through a rectifier 108 and a capacitor 110 to the input terminal 70 and through a rectifier 112 and a capacitor 114 to input terminal 72. Similarly, solenoid 104 is connected through a rectifier 116 and the capacitor 110 to input terminal 70 and through a rectifier 118 and the capacitor 114 to the input terminal 72. Rectifiers 108 and 112 are arranged to permit electric flow from solenoid 102 through ground to charge capacitors 110 and 114 respectively and rectifiers 116 and 118 are arranged to permit discharge of capacitors 110 and 114 through solenoid 104 to ground.

In operation, when transfer contact 38 is shifted into engagement with fixed contact 48 to apply a positive impulse to input terminal 70, electric current will pass through rectifier 108 and solenoid 102 to ground to charge capacitor 110. The flow of current through solenoid 102 will attract the core 98 thereof to pivot the lever 90 to the position illustrated. Upon restoration of contact 38 into engagement with the fixed contact 48 connected to ground, the capacitor 110 will be discharged through rectifier 116 and the solenoid coil 104 to attract the core 100 thereof to pivot lever 90 in a counterclockwise direction. That is, in operation lever 90 repetitively makes transitions between its two extreme positions, first in one direction or order and then in the opposite direction. Similarly, when a positive impulse is imposed upon the input terminal 72 by engagement of the transfer contact 78 with the contact 84, capacitor 114 will be charged through a circuit through the solenoid coil 102 and the rectifier 112 and, upon restoration of the transfer contact 78 into engagement with the grounded contact 82, capacitor 114 will be discharged through rectifier 118 and the solenoid coil 104.

It is apparent therefore, that if the vehicle is at rest so that no signals appear at input terminal 70, the lever 90 will be pivoted back and forth to advance the "fare" and "units" registers 14 and 16 by the alternate energization of solenoids 102 and 104 as controlled by the charging and discharging of capacitor 114 and that, when the pulse recurrence rate of the variable pulse recurrence rate signal appearing upon input terminal 70, as controlled by the speedometer cable 52, exceeds that of the uniform pulse recurrence rate signal appearing at the input terminal 72 under the control of the clock 74, the lever 90 will be pivoted back and forth by alternate energization of the solenoids 102 and 104 in response to charging and discharging of the capacitor 110.

The exact relation and interaction of the two pulse trains is shown in FIGURE 2. In FIGURE 2, the top line illustrates the impulses transmitted at a uniform recurrence rate by the clock 74, through input terminal 72, the positive impulses indicating the charging of capacitor 114 and resultant energization of coil 102 and the negative impulse indicating the discharge of capacitor 114 and resultant energization of coil 104. The middle line illustrates the impulses transmitted to the input terminal 70 under the control of the speedometer shaft 52 at some faster rate than the pulse recurrence rate of the signals applied to input terminal 72, the positive impulses indicating the charging of capacitor 110 and the resultant energization of coil 102 and the negative impulses representing the discharge of capacitor 110 and the resultant energization of coil 104. The bottom line shows the combined effect of the pulses shown in lines 1 and 2 upon the solenoids 102 and 104, that is, all of the impulses applied to both input terminals 70 and 72 are shown on the bottom line, with the clock pulses at terminal 72 shown in dashed lines, and the impulses which actually move the cores 98 and 100 of the solenoids being shown in heavier and blacker lines. As will be seen from a study of this bottom line of this chart, the solenoids will respond to the proper number of pulses but sometimes vacillates in selecting the origin of a particular pulse to which it responds. In responding to a pulse of "opposite" origin there is a negating of the effect of another subsequent impulse of like polarity until a pulse of opposite polarity has actuated the other solenoid. This is seen on the upper side of the base line for the graph of the combined pulses. The first three positive pulses from the input terminal 70 are actuating pulses, the next positive actuating pulse following is from the clock, through terminal 72 but this anticipates the immediately following mileage positive pulse at input terminal 70. The negative side of the same mileage pulse is the actuating pulse for the negative side of the circuit. Thus, while ocasionally a clock pulse will be an actuating pulse, the actual frequency of operation of registers 14 and 16 is determined by the mileage pulses so long as their recurrence rate exceeds that of the clock pulses. This particular example illustrates the vehicle rate of input as faster than that from the clock. When the vehicle input slows below the clock input rate or ceases due to stopping, the clock impulses will be more frequent and will be the ones controlling the actuation of the "fare" and "units" registers.

FIGURES 3 and 4 illustrate modifications of the comparator 68 illustrated in FIGURE 1 utilizing stepping motors of the type manufactured by the A. W. Haydon Company of 232 North Elm Street, Waterbury, Connecticut and designated as the 18100 Series Stepper Motors. These stepper motors may be operated with windings continuously energized in static condition, or operated with pulses at rates up to twenty four hundred steps per minute. The basic circuit of these motors comprises a pair of alternatively energizible coils. These coils must be energized alternately in order to obtain rotation of the motor output shaft. Consecutive pulses to but one of the windings will not advance the motor output shaft. In the basic commercial form of these motors the output shaft rotates 30° for each cycle of operation of the motor, that is, successive energization of both coils will produce 30° rotation of the output shaft. These motors have a rated load of 0.2 ounce-inch at 20° C., a rated voltage of 27 volts D.C., a rated current of 140 milliamperes at 20° C., a resistance of 200 ohms in each coil at 20° C., an inductance of 100 millihenries, and a pulse requirement of a 12.5 millisecond minimum pulse.

Referring to FIGURE 3, a stepper motor of the above described type is illustrated digrammatically at 130 and shown to have a pair of coils 132 and 134, coil 132 being connected to a source 136 of positive potential and coil 134 to a source 137 of negative potential, both with respect to ground. Independent input leads 138 and 140 for coils 132 and 134 are connected respectively to the collector leads of transistor amplifiers 142 and 144. Amplifier 142 is an NPN type transistor while amplifier 144 is a PNP type transistor. The input lead 146 to the base of amplifier 142 is connected in common to diodes 108a and 112a and the input lead 148 to the base of amplifier 144 is connected in common to diodes 116a and 118a. The emitters of amplifiers 142 and 144 are connected to ground. The input circuits to amplifiers 142 and 144 from the input terminals 70a and 72a with the exception of the addition of resistors 120a and 122a are identical with that illustrated in FIGURE 1 and described in detail above. When a positive signal appears on the input lead 146 during the charging of capacitor 110a or 114a, amplifier 142 will be rendered conductive to energize coil 132 of stepping motor 130 to impart 15° of rotation to the output shaft 150 of stepping motor 130 and thereby advance the Fare and Units counters 14a and 16a through the drive connection through the reduction gearing 57a. During the subsequent discharge of either capacitor 110a or 114a, a negative signal will appear on the input lead 148 of amplifier 144. The negative signal applied to input lead 148 upon the discharging of either capacitor 110a or 114a will render the amplifier 144 conductive to energize the coil 134 of the stepping motor 130 to thereby impart a further 15° rotation to the output shaft 150 and prepare the stepper motor 134 for response to energization of coil 132.

By this arrangement, it is clear that the stepper motor 130 will respond only to impulses received from amplifiers 142 and 144 alternately resulting from the alternate charging and discharging of one of the capacitors 110a or 114a.

The embodiment of FIGURE 4 is basically the same as that of FIGURE 3, the corresponding elements of the embodiment of FIGURE 4 being given the same reference numerals but with the added letter "b." As is apparent, an input circuit in the form of an LR circuit consisting of resistor 120b and an inductance 110b has been substituted for the RC circuit formed by capacitor 110a and resistor 120a and an LR circuit formed by a resistor 122b and inductance 114b has been substituted for the RC circuit of FIGURE 3 formed by capacitor 114a and resistor 122a. As in the preceding embodiment, the application of positive potential to input terminal 70b will through the action of resistor 120b and inductance 110b produce a positive pulse signal to amplifier 142b to energize coil 132b of stepping motor 130b and the removal of the positive potential from input terminal 70b will produce a negative impulse to the input of amplifier 144b to energize coil 134b of stepper motor 130b. The application of positive potential to input terminal 72b and the removal of that positive potential from input terminal 72b will similarly produce a positive signal at the input to amplifier 142b and a negative signal to the input to amplifier 144b respectively.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a taximeter having a total mileage register, a paid mileage register, a fare register and a first signal generator for generating a first impulse train having a uniform pulse recurrence rate, a second signal generator for generating a second impulse train having a pulse recurrence rate variable in accord with the speed of the vehicle in which said meter is installed, means connecting said second generator to actuate said total mileage register in response to each impulse produced by said second generator, selectively actuate means for connecting said second generator to actuate said paid mileage register in response to each impulse produced by said second generator while said selectively actuated means is actuated, and a pulse recurrence rate comparator connected to said first generator and to the output of said selectively actuated means and operative to actuate said fare register in accord with the more rapid pulse recurrence rate.

2. In a taximeter, means for generating a first signal impulse train having a uniform pulse recurrence rate, means for generating a second signal impulse train having a pulse recurrence rate variable in accord with the speed of a vehicle in which the meter is to be mounted, a fare register, and a comparator responsive to both said signal impulse trains for actuating said fare register in accord with the one of said signal trains having the more rapid pulse rate.

3. The taximeter defined in claim 2 wherein said comparator comprises a bi-stable device having a pair of inputs, one input connected to each of said pulse train generators, said bi-stable device being responsive to a signal having a first characteristic from either of said inputs to assume a first stable state and responsive to a signal having a second characteristic from either of said inputs to assume a second stable state, said bi-stable device including an output responsive to a transition of said device between said states in at least one order to actuate said fare register.

4. In a taximeter, means for generating a first signal impulse train having a uniform pulse recurrence rate; means for generating a second signal impulse train having a pulse recurrence rate variable in accord with the speed of the vehicle in which the meter is to be mounted; a fare register; and a comparator responsive to both said signal impulse trains for actuating said fare register in accord with the one of said signal trains having the more rapid rate, said comparator comprising a bi-stable device, and a pair of inputs, one input connected to each of said pulse train generators, said bi-stable device being responsive to a signal having a first characteristic from either of said inputs to assume a first stable state and responsive to a signal having a second characteristic from either of said inputs to assume a second stable state, said bi-stable device including an output member and a pair of signal responsive alternately energizable electro-magnetic means connected to move said output member through predetermined interstate transitional paths, said fare register being responsive to a transition of said output member between said states in at least one order.

5. The taximeter defined in claim 4 wherein said output member is a rotatable shaft.

6. The taximeter defined in claim 4 wherein said output member is a pivoted link.

7. The taximeter defined in claim 4 wherein said comparator further comprises a pair of pulse forming networks, one connected to each of said inputs and each connected to each of said electro-magnetic means through reversely oriented rectifiers such that each of said pulse forming networks may develop an impulse of one sense operative upon one of said electro-magnetic means and develop an impulse of the opposite sense operative upon the other of said electro-magnetic means.

8. The combination defined in claim 4 wherein said electro-magnetic means are solenoids.

9. The combination defined in claim 7 wherein said pulse forming network is a resistance-capacitance circuit.

10. The combination defined in claim 7 wherein said pulse forming network is a resistance-inductance circuit.

11. A taximeter comprising a fare register; first and second pulse generators each producing a train of alternating and distinct first and second pulses at train frequencies respectively proportional to time and vehicle speed; and pulse responsive cyclic drive means connected to said generators to actuate said fare register including first and second sequentially alternate, semi-cyclic operating means each respectively responsive to said first and second distinct pulses of either of said pulse trains to respectively operate said drive means through alternate first and second portions of its cycle to drive said fare register in accord with the higher frequency pulse train.

12. A meter comprising a quantity indicator; a plurality of pulse generators each producing a train of alternating and distinct first and second pulses at different train frequencies; and pulse responsive cyclic drive means connected to said generators to actuate said quantity indicator and including first and second sequentially alternate, semi-cyclic operating means each respectively responsive to said first and second distinct pulses of said pulse trains to respectively operate said drive means through alternate first and second portions of its cycle to drive said quantity indicator in accord with the higher-frequency pulse train.

13. A counting meter comprising a bi-stable device having a pair of inputs; a pair of selective signal transmission means each connected to one of said inputs, one of said transmission means being operative to transmit only signals of a first predetermined characteristic to actuate said bi-stable device to assume a first stable state, the other of said selective signal transmission means being operative to transmit only signals of a second predetermined characteristic distinct from said first predetermined characteristic to actuate said bi-stable device to assume a second stable state; a pair of repetitively operated circuit modifying devices each respectively connected to both of said selective transmission means, said devices being adapted to produce signals of said first and second predetermined characteristics by alternate circuit modification and reverse modification, respectively; a cyclic output means connected to said bi-stable device to cycle upon transitions, in at least one order, of said bi-stable device between said first and said second stable states; and a count indicator connected to said cyclic output to indicate in accord with the number of circuit modifications made by the more rapidly operated circuit modifying device.

14. A counting meter as defined in claim 13 wherein said circuit modifying devices are switches.

15. A counting meter as defined in claim 13 wherein said bi-stable device includes a pair of electro-magnetic coils each connected to one of said inputs, said device being adapted for transitional actuation only upon alternate energization of said coils.

16. A counting meter as defined in claim 15 including a stepping motor incorporating said pair of electro-magnetic coils and a step-rotating output shaft.

17. A counting meter as defined in claim 15 together with a pair of amplifying devices each connected between one of said bi-stable device inputs and its respective selective transmission means.

References Cited in the file of this patent

UNITED STATES PATENTS

| | | |
|---|---|---|
| 1,171,889 | Robinson | Feb. 15, 1916 |
| 1,789,811 | Francis et al. | Jan. 20, 1931 |
| 1,823,523 | Apple | Sept. 15, 1931 |
| 2,562,697 | Clapp | July 31, 1951 |
| 2,637,492 | Winch | May 5, 1953 |
| 2,815,500 | Hance et al. | Dec. 3, 1957 |
| 2,995,706 | Clarridge | Aug. 8, 1961 |
| 3,012,712 | Haupt | Dec. 12, 1961 |

FOREIGN PATENTS

| | | |
|---|---|---|
| 600,806 | Great Britain | Aug. 20, 1948 |